S. B. SEXTON.

HEATING-STOVE.

No. 6,884. Reissued Jan. 25, 1876.

Witnesses.

C. F. Burr

M. Church

Inventor

Samuel B. Sexton by.

Hill & Ellsworth his attys.

N. PETERS, PHOTO-LITHOGRAPHER, WASHINGTON, D. C.

UNITED STATES PATENT OFFICE.

SAMUEL B. SEXTON, OF BALTIMORE, MARYLAND, ASSIGNOR OF PART INTEREST TO ADAM R. REESE.

IMPROVEMENT IN HEATING-STOVES.

Specification forming part of Letters Patent No. 23,716, dated April 19, 1859; reissue No. 1,242, dated December 3, 1861; reissue No. 1,622, dated February 6, 1864; reissue No. 1,774, dated September 27, 1864; reissue No. 2,476, dated February 12, 1867; extended 7 years; reissue No. 6,884, dated January 25, 1876; application filed November 7, 1874.

*To all whom it may concern:*

Be it known that I, SAMUEL B. SEXTON, of Baltimore, in the State of Maryland, have invented certain new and useful Improvements in Base-Burning Stoves for heating and warming purposes; and I do hereby declare the following is a full, clear, and exact description of the same, reference being had to the accompanying drawings forming part of this specification, in which—

Figure 3:
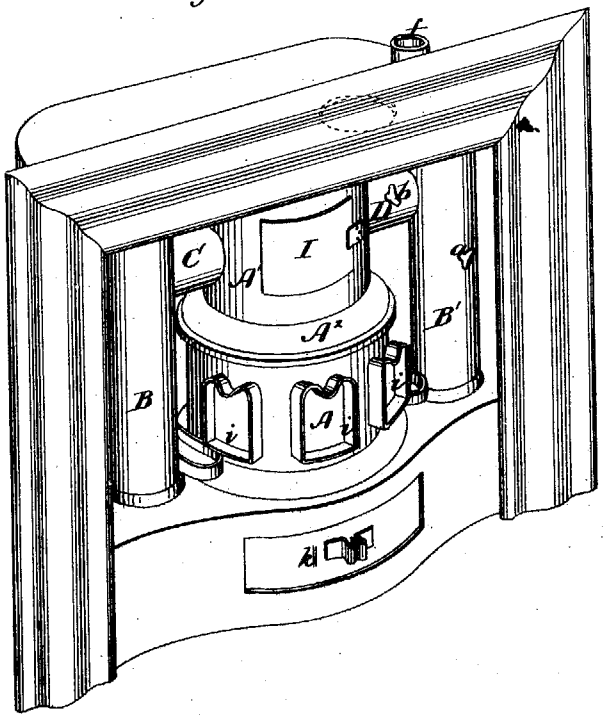
Figure 1:
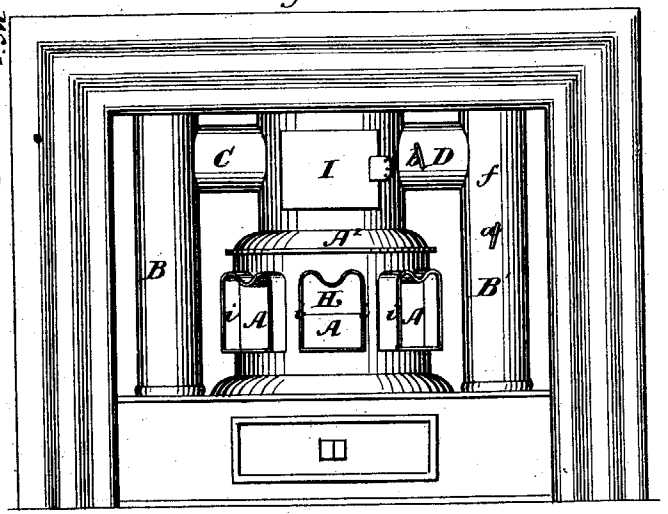
Figure 2:
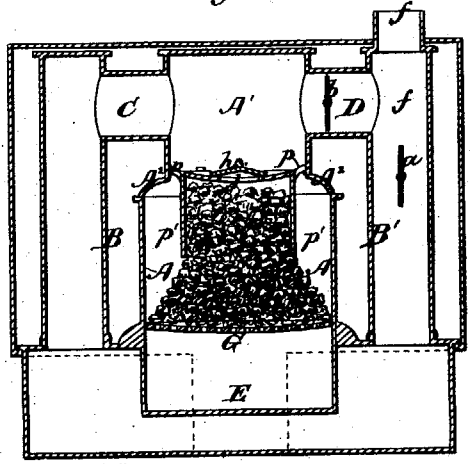

Figure 1 is a front elevation of a stove constructed according to my invention. Fig. 2 is a vertical longitudinal section of the same, and Fig. 3 is a perspective view of the same.

Similar letters of reference indicate the same parts.

To make a good magazine base-burning stove for heating and illuminating purposes, it is essential to adopt the following features of construction:

First, to have a free enlarged space between the lower end of the magazine and the grated or perforated fire-bed upon which the pile of coals rests; and this space should extend (all around) outwardly both below and around the lower free end of the magazine, and also be wholly unobstructed from said lower end, both out to the outside casing of the stove, and down to the outer edge of that part of the stove which constitutes the grated fire-bed or bottom surface of the combustion-chamber. By adopting this feature of construction, and having the grated or perforated fire-bed of greater diameter than the lower end of the magazine, so that air is admitted through the grate from the center thereof to the outside casing of the stove, a sufficient amount of heat from this class of stoves is secured from a given amount of fuel, for the coal which is constantly being supplied from the magazine will freely spread out laterally (all around) from the lower end of the magazine in the form of a truncated cone, the base of which will extend to the walls of the combustion-chamber. To thus have the coals spread out upon a large grated or perforated base (all around) and stand in a free space in a conical pile, instead of having them deposited in a grated fire-pot of cylindrical form, or into a deep perpendicular-sided pit, or into a concave basin with small area of grated or perforated surface, is of vital importance, for the coals thus spread out on a perforated surface, outside of the range of the magazine, burn freely in thin layers, from the largest diameter of the cone-pile to the smallest diameter thereof, and at all intermediate points, at one and the same time. In a word, the coal is burnt on the surface of the entire cone-pile in thin layers, and in a free space, all at the same time, the free space being between the conical pile and the outside casing, and the air being admitted directly under the coal which is burnt in this space, as well as under that coal which is directly under the magazine. The effect of thus burning the coal is obvious; but it may be important to state that the flame strikes directly upon the outside casing of the stove, where it is clear from all obstructions, above the grate and above the sides of the fire-pot, and the intensest heat is radiated from said casing into the room.

Second, the outer casing of the stove should have illumination-windows in it, and these illuminators should always be between the base of the conical pile of coals and the top of the fuel-magazine, so that some part of the windows shall be directly opposite the free space in which the gases of the coal burn with a bright flame; further, they should be so located that the burning or partially-ignited coals shall not be allowed to pile up against them, although there is no shield or skirting in front of them.

To have it certainly understood as to where I desire these windows located, I will state that their lower ends should at least be as high, if not higher than the point where the spreading of the coals is arrested. By thus locating the windows opposite the free space, or between the base and top of the conical pile of coals, and having the magazine arranged over a free space which is between it and the enlarged grated or perforated fire-bed, the light from a bright free flame of gas is unobstructedly transmitted through the windows into the room, and the most cheerful effect is produced, while every desired comfort from the heat of the stove is secured, and at the same time I avoid the necessity of using an interior skirting, which acts to prevent the direct radiation of heat, the very thing which should not be prevented in this kind of stove.

I would state in this connection that, to prevent rapid discoloration or destruction of the material of which the windows are composed, from direct contact of flame, these windows are best if set out in relief from the interior of the cylinder, frame, or body of the stove.

Third, a gas-space or partially spent gas-space around the upper portion of the magazine should be formed, so that the gases will circulate in contact with the circumference of the magazine, (all around,) this space communicating with the free space which is between the magazine and the grated fire-bed, and between the lower part of the magazine and the illumination outside casing of the stove; this space allowing the gases to circulate in contact with the circumference of the magazine all round in their passage to the draft-flue, thus heating the upper part of the magazine and stove, and keeping the coals in the magazine at such a temperature as will insure a ready and perfect emission of their expanded gases down through the incandescent pile of coals.

Fourth, to increase the beneficial effect of a stove which embraces the foregoing features of constuction, and also to prevent ignition of the coal in the upper part of the magazine, it is advisable, in many cases, but not absolutely necessary, to have the products of combustion circulate over the cover of the magazine, and in immediate contact with it, for as these products contain but little atmospheric air, they act as a packing to prevent such air finding an ingress into the top of the magazine.

To enable others skilled in the art to make and use my invention, I will proceed to describe the same.

A is the main or lower part of the stove, constituting by its own outside casing a part of the combustion-chamber. The interior lower portion of this chamber may be, as usual, lined with fire-brick or other durable material.

The grate G, upon which the conical pile of burning coals rests, should be substantially horizontal, so as to receive the falling coals properly. It is essential that the bed upon which the base of the conical pile of coals rests be so constructed that the coals may spread out toward the inner side of the combustion-chamber of the stove beyond the lower end of the magazine H, and that the lateral extension of the fire-bed shall be grated or perforated, so that air shall be supplied to the coals near the inner side of the combustion-chamber of the stove, as well as to the coals which lie near the middle of the grate. In a word, it is essential to supply sufficient air up through the grated fire-bed to keep up lively combustion of the coal on all parts of the grate.

To this end I have made the grate G equal in diameter to the lower end of the combustion-chamber, and of considerably greater diameter in its grated or perforated surface than the lower end of the magazine.

To heat all parts of this lower or main chamber of the stove the grated surface of the fire-bed should extend out, all around, beyond the lower end of the magazine.

Under the grated fire-bed the usual ash-pan is placed in the base E, which base may be constructed either hollow or solid, around or beneath the ash-pan, in any of the known ways.

Through the outside casing A illumination-apertures *i* are formed. These apertures are located above the point where the broadest or base portion of the conical pile of coals rests, and in such relation to the lower end of the magazine H that the falling and spreading conical pile of coals cannot come up against them.

Around the outer edge of each of the apertures a projecting window or door frame is formed. Through these windows the fire may be kindled on the grate under the magazine. By inspecting the drawings the relative location of the windows and the magazine and grate will be seen.

A′ is the upper portion of the stove. This may only communicate (directly) with a chimney-flue, *f*, by a branch, D, located at its back, or at any other point desired, or it may have one or more side columns, B B′, leading into a hollow base, and connecting thus indirectly with the chimney-flue *f*, the respective columns or flues to be controlled by dampers *a* or *b*, or by both *a* and *b*. The arrangement of flues and dampers, however, is no part of my claim under this patent, except so far as they form necessary connections with my invention to enable me to make it useful and practical in a stove for warming purposes.

The upper portion A′ of the stove is furnished with a door, I, so that coal may be introduced into the apartment A.

The location of this door may be such as to suit circumstances or the style of the stove.

H is the magazine or coal reservoir, from which the fire is continuously fed. This magazine is closed at top, except at its center, where a hole, J, is cut. This is the supply-hole, through which fresh coals are fed into the magazine. It is furnished with an adjustable or removable cover, *h*.

The diameter of the magazine is less than the diameter of any part of the interior of the stove, and it is arranged vertically within the stove, so that its lower end generally reaches down about midway of the depth of the portion A. The upper end of the magazine may extend more or less up into the part A′ of the stove.

There is a space or chamber between the inner side of the stove and the outer side of the magazine, and at the point where the gases of the coals escape from the part A into the part A′ of the stove. The last-mentioned space *p p* is more or less contracted with respect to the first-mentioned space *p'*.

In locating the supports of the magazine it is desirable to place them as far out of contact with the incandescent mass of coals as practicable, in order to save them from rapid destruction by the red heat. In the drawings they are shown at the upper end of the fuel-magazine, at the points where the letters *p p* (which designate the contracted gas-space) are placed.

When the magazine is most properly applied within the stove there will be a space between the supports all around the magazine, and between the outside casing of the stove and that portion of the magazine which is below the plate $A^2$. There will also be an unobstructed free space below the magazine, extending down to the grated fire-bed, and out to the outside casing of the stove, or the lining thereof.

There will likewise, in many cases, be a space for the circulation of the products of combustion above the magazine and in contact with the cover thereof. This latter space, however, is rather a furtherance of the beneficial effects of my main invention or improvements than an absolute prerequisite.

All of the said spaces communicate with one another, and terminate in the draft-flue *f*. Thus the gases or products of combustion circulate in contact with the interior of the upper part of the stove, and also around and below the magazine.

In my stove are a fuel-magazine of smaller diameter than the grated fire-bed, and a fire-chamber formed directly by the outside casing of the stove itself, said magazine being so applied that there is an upward-draft space outside of it (all around) above its lower end, and also a gas-burning space outside of and between its lower end and the upper outer edge of the grated surface, this arrangement being such that the highly-inflamed gases are thrown off in an undivided body from the entire surface of a conical pile of burning coals, which occupies a larger area of grated and air-supplying surface than the superincumbent supply in the magazine, directly against the radiating-surface of the stove, at points below the end of the magazine, and above the upper outer edge of the grated bed, such inflamed gases being emitted in a free space, and rising opposite illumination-windows, which are opposite said free unobstructed space, and, passing into the space between the upper part of the stove and the upper part of the magazine, escape into the draft-flue. The most perfect combustion, radiation, and illumination are thus secured.

The most advantageous manner of using the stove represented is as follows:

To kindle the fire, the damper *b*, the door I, and the draft-door slide *k* of the ash pan or pit are opened, and the cover *h* removed. A plentiful supply of kindling is now placed on the grate G, under the magazine, through the aperture of the illumination-window frames. The kindling being ignited, a moderate supply of coal is introduced into the magazine, and the door I closed. The draft being directly up through the magazine, the coal is in a short time thoroughly ignited. The fuel-magazine is now to be completely filled with hard coal, the cover *h* replaced over the opening J, and the door I shut. When this mass of coal is sufficiently heated throughout, the damper *b* is partly or wholly closed—that is, if there are no diving-flues to the stove; but if diving-flues are constructed with the stove, the damper *b* may always be kept entirely closed after the fire is fully started, and a damper, *a*, be used as the regulator, in connection with the draft door or slide *k*.

I have found that the stove, when in full burning or blast, will burn slowly with both dampers and the draft-door closed; and it is advisable to thus adjust the regulator on going to bed, as the fuel will then consume but slowly during the night.

The coal in the part A of the stove being perfectly incandescent outside of the circumferential range of the magazine when the fire is at full blast, the greatest possible amount of heat and light is evolved and emitted; and as the front of the stove, or the whole body of the part A of the stove, is provided with windows directly opposite a free space and the incandescent mass of fuel, and as all the descending gases from the magazine or reserve supply coal are burned, with a bright flame, as they pass over the red coals, a brilliant and cheerful appearance is presented to view.

I will here remark that I mean by the term "thin layers" that the coal on the surface of the conical pile presents a step-like appearance or arrangement, and, therefore, each step on the surface may be designated as a layer, which layers, respectively, as they rise on the cone, decrease in diameter, leaving room for surface-burning on each layer.

Having thus described my invention, I claim the following as new, viz:

1. A base-burning stove with a fuel-magazine supported free from the fire-grate, and a free and unobstructed space between the lower end of the magazine and the inner side of the combustion-chamber, in combination with a series of illuminating-windows arranged in the outer casing, to give light and heat to the room from the burning coal that lies between the lower end of the magazine and the inner side of the combustion-chamber, substantially as described.

2. In a base-burning stove, the fuel-magazine, supported free from the grate, with a free and unobstructed space between the lower end of the magazine and the inner side of the combustion-chamber, in combination with a series of illuminating-windows projecting beyond the outer casing, substantially as described, and for the purpose specified.

3. In a coal-supplying magazine-stove, I claim the extended grate-surface of the fire-bed outside of reservoir or magazine, in combination with the free space around the magazine of a base-burning stove, substantially as described.

4. In a base-burning magazine-stove, I claim a substantially flat or horizontal grate-surface of the fire-bed, of larger diameter than the lower end of the magazine, combined with an inclosed, but unobstructed, space around the magazine, substantially as described.

5. In a stove, having a suspended magazine and a free space around and beneath the lower part of such magazine to contain the coal and gases while in process of combustion, I claim a horizontally-arranged series of openings through the wall of the stove, opposite the lower end of the magazine, and on different sides of the stove, for the purposes described.

SAMUEL B. SEXTON.

Witnesses:
L. HILL,
MELVILLE CHURCH.